FAST SWITCHING HIGH CURRENT AVALANCHE TRANSISTOR

Filed Nov. 27, 1962

United States Patent Office 3,319,138

Patented May 9, 1967

3,319,138

FAST SWITCHING HIGH CURRENT AVALANCHE TRANSISTOR

Henry P. Bergman, Dallas, and John C. Brixey, Jr., Richardson, Tex., and Dennis E. Tschudi, Northridge, Calif., assignors to Texas Instruments Incorporated, Dallas, Tex., a corporation of Delaware Filed Nov. 27, 1962, Ser. No. 240,328
6 Claims. (Cl. 317—235)

This invention relates to semiconductor devices and, more particularly, to transistors having graded junctions with controlled layer dimensions wherein the trigger delay is constant and is dependent upon base and collector thicknesses. Thus, the present invention relates to an improved avalanche-high current mode switching device.

Semiconductor devices of silicon or germanium suitably built have been found to exhibit breakdown characteristics where, upon application of suitable control or conditioning voltages, the internal electrical arrangement of the charge distribution is so patterned that the collector depletion region touches the base-emitter junction. At this point breakdown occurs. This is called the "punch-through" effect. The collector voltage at which this occurs is called the "punch-through" voltage. Such devices have been found to be capable of producing pulses of relatively short rise time. However, reliability of such devices generally known in the prior art and the magnitude of the current involved in the pulse thus produced are subject to fairly severe limitations.

Devices of the avalanche type are employed in switching operations or pulse generating operations where it is desirable that the current avalanche take place within the structure repetitively at a fixed time interval following the application thereto of each control pulse. Operation in the high current mode takes place when there are sufficient carriers available to sustain high current. For example, if a hole entering the space charge region from the N-type side of a junction is capable of producing, on the average, one ionizing collision, and if the conduction band electron so created also produces on the average one electron-hole pair in its flight back across the depletion layer, then the current will be self-sustaining. At the voltage corresponding to the particular field configuration which makes this possible, the current would theoretically increase without limit. Introduction of additional carriers at this point may result in transition to the high current mode, a conduction condition somewhat above normal avalanche current levels. The point at which this phenomenon takes place has been found to be variable as to introduce considerable deviation and irregularity in the operation of high current devices of the prior art. For example, in computer operation the performance of logical funcitons with high reliability requires the time of arrival of pulses at various circuits in the system to be accurately controlled. This means that pulse circuitry must have relatively constant trigger delays. For high-speed operations not only are sharp pulses required, but it is necessary to be able to trigger them with as small a delay as possible in order to realize a high rate of pulse propagation through the logical circuits. Applicants have found that by control of the dimensions of the base and collector regions, as well as the resistivities and doping gradations thereof, reliable high current devices can be produced.

In accordance with the present invention, there is provided a device in which the impurity concentrations, the depths thereof, and the thicknesses of the various layers bear particular relationships one to another in order to assure a new and improved operation, operation in which the reliability of the device is greatly increased and in which the rise time is substantially shorter and the power capability of the device is substantially increased.

More particularly, a collector-substrate boundary is graded in a particular manner. Further, the collector-base junction and the base-emitter junction are graded with specified dimensional relationships existing therebetween such that, upon application of a voltage to the collector, the collector depletion region will reach or touch the low resistivity substrate at least as soon as the depletion region reaches the emitter junction, thereby accommodating an abrupt transition in the conduction character of the device while, at the same time, providing for an adequate supply of electrical quantities, either carriers or holes as the case may be, for high current flow.

In a preferred embodiment of the present invention, a low resistivity solid substrate supports an epitaxial layer having a resistivity of at least an order of magnitude higher than that of said substrate. A base layer in the surface of the epitaxial layer is of thickness about one-fourth the thickness of the epitaxial layer. An emitter layer in the base layer is of thickness about six-tenths the thickness of the base layer. Preferably, the surface concentration of the dopant for the base layer is an order of magnitude less than the surface concentration of dopant for the emitter layer.

For a complete understanding of the present invention and for further objects and advantages thereof, reference may now be had to the following description taken in conjunction with the accompanying drawings in which.

Figures 1, 2:
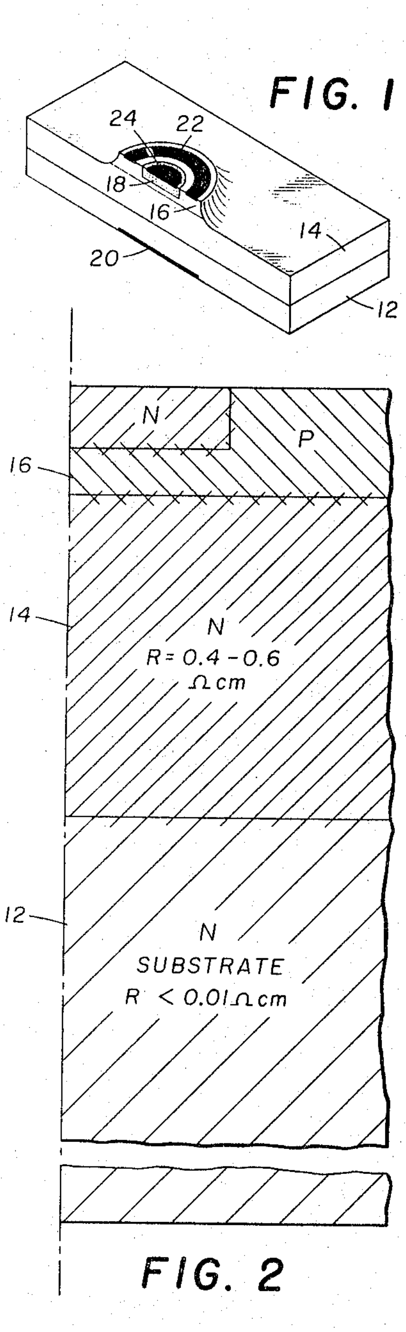
FIGURE 1 is a sectional view of an epitaxial transistor.
FIGURE 2 is a graph showing dimensional relationships in the system of FIGURE 1.

FIGURE 1 illustrates a mesa transistor structure. A substrate 12 forms a foundation for the structure including an epitaxially grown layer 14 which forms a collector layer and into which a base and emitter are diffused. The base layer 16 is diffused into the upper surface of the epitaxial layer 14. An emitter layer 18 is diffused into the base layer 16. A collector terminal 20 is provided on the substrate. A base terminal in the form of a ring 22 is formed on the surface exposure of the base layer 16. An emitter terminal 24 in the form of a metallized disk is formed on the surface exposure of the emitter.

The device, so far as structure is concerned, corresponds with the epitaxial mesa transistors known in the art. However, applicants have found that the dimensions as well as the resistivity and doping concentrations in the various layers are very critical relationship one to another if high current mode avalanche-type transistors are to be produced in quantity and are to have reliable and reproducible operation. In actually forming the structure of FIGURE 1, the device is a planar device with the base layer 16 being etched away so that the collector layer is exposed outside the mesa. However, in either mesa or planar configurations, resistivity and doping levels are controlled so that reliable operation is assured.

A preferred embodiment of the invention is illustrated in FIGURE 2. A sectional view across the device of FIGURE 1 through the mesa portion thereof is represented in FIGURE 2 to show the various boundaries between the elements. The substrate layer 12 is formed with a resistivity preferably less than 0.01 ohm-cm. The epitaxial layer 14 is formed on the substrate 12. The layer 14 is characterized by a resistivity substantially higher than that of the substrate 12 and of the order of 0.4 to 0.6 ohm-cm., preferably the latter. The collector layer 14 is of the same conductivity type as the substrate, i.e.: either an N-type material is deposited on an N-type substrate or a P-type material is deposited on a P-type substrate. The substrate 12 is of the order of 0.005 inch thick. The epitaxial layer 14 has a depth of from 0.00035 to 0.00045 inch, preferably 0.0004 inch.

The depth of the base layer 16 is about 0.0001 inch with a surface concentration of a conductivity type opposite that of the collector layer 14 of about $10^{19}$ atoms/cm.$^3$.

Figure 3:
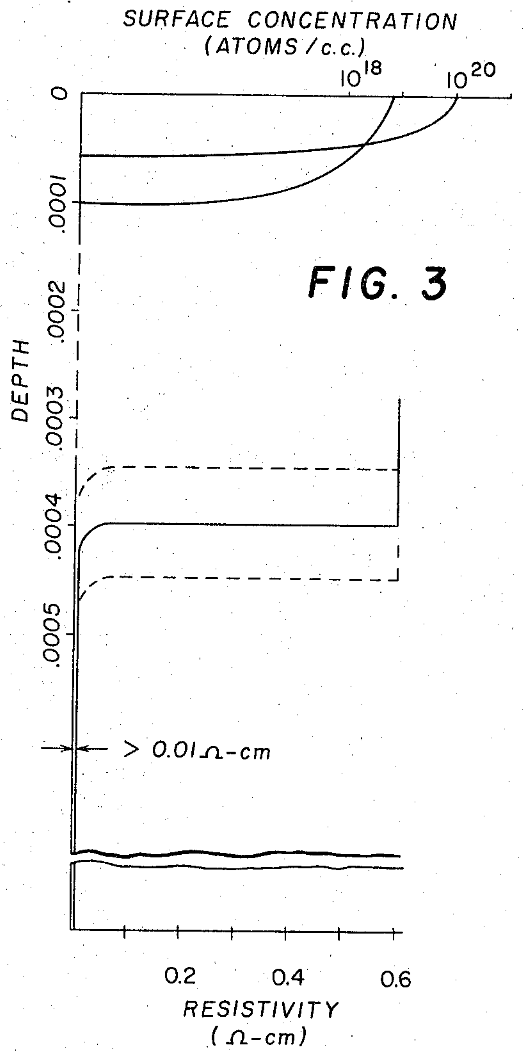
FIGURE 3 is a graph showing gradations between regions in the system of FIGURE 1.

The emitter layer is diffused into the base layer to a depth preferably of the order of 0.00006 inch and has a dopant surface concentration of conductivity type corresponding with that of the collector layer 14 of about $10^{20}$ atoms/cm.$^3$. As best illustrated in FIGURE 3, the boundaries or junctions between the collector and the substrate, the collector and the base, and the base and the emitter are graded junctions. The dimensions, resistivities and impurity concentrations are so controlled, as above indicated, that the transition to high current mode at the emitter-base junction will be controlled primarily by the thicknesses of the base and collector layers. More particularly after the device has avalanched, transition to the high current mode may be brought about by injection of carriers adequate to modulate the resistivity of the collector. Modulation to the low resistivity level of the substrate as by carrier injection at the base results in the onset of high current. Thus, the trigger delay of the device may be controlled by variation in the thickness of the collector layer and the base layer. The thicker the collector layer for a given base layer thickness, the greater the trigger delay.

In accordance with one embodiment of the present invention, an epitaxially deposited layer of 0.4 to 0.6 ohm-cm. silicon 0.00035 to 0.00045 inch thick is formed on silicon substrate, the resistivity of which is less than 0.01 ohm-cm. This material is either N on N or P on P.

This starting material is then scrupulously cleaned and oxidized, as in a quartz-lined furnace at high temperature, to produce an oxide layer thick enough to mask against diffusants to be employed. A diffusant such as boron or gallium from Group III in the Periodic Table may be selected to form P-type semiconductors. A diffusant such as phosphorus from Group V may be selected to form N-type semiconductors.

After a photolithiographic process which preferentially removes oxide, the slices are base diffused until there is a surface concentration between $8\times10^{18}$ to $1\times10^{19}$ atoms/cm.$^3$ and a diffusion depth of 0.0812 to 0.276 milli-inch.

Another photolithographic process follows in which emitter patterns are cut through the oxide so that the emitters are diffused into the base layer until there is a surface concentration of about $10^{20}$ atoms/cm.$^3$. The emitter diffusion is conducted such that the base layer beneath the emitter is approximately 0.04 milli-inch wide.

The next step involves the affixing of base and emitter ohmic contacts to the appropriate regions on the device.

This is accomplished after preferentially removing the oxide in the desired areas and applying a metal film over the entire surface and preferentially stripping the excess from undesired areas. In the case of planar type of diffusions, the material is now ready for dicing and assembly upon headers. For mesa-type diffusions, the material must first go through a mesa etch which removes the excess base material on each unit.

After completed slices have been scribed and broken, they are cleaned and each diced particle, which is in itself a complete device, is alloyed to a gold-plated header. A preform unit can be used to assist in forming a eutectic with the collector material.

Gold wire may then be ball-bonded to the emitter and base contacts and each contact wire spot-welded to the appropriate feed-through post on the header.

The assembled device is then ready for pre-can wafer treatment to free the surface of detrimental contaminants and moisture prior to encapsulation. An appropriate can or cover is then resistance welded to the header.

Figure 4:
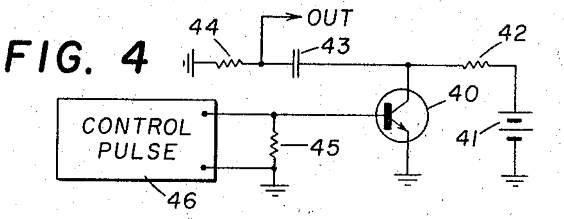
FIGURE 4 is a circuit for employing the unit of FIGURES 1–3.
Figure 5:
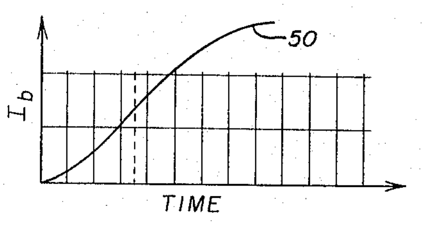
FIGURE 5 is a graph of control current versus time in the circuit of FIGURE 4.
Figure 6:
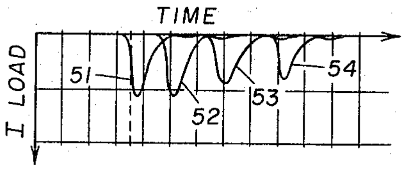
FIGURE 6 is a graph of load current in the circuit of FIGURE 4.

Devices formed as above described and of the type illustrated in FIGURES 1–3 employed in circuits shown in FIGURE 4 may provide output pulses with time delays consistently much less than millimicroseconds in variation. In FIGURE 4 the device 40 is connected at the emitter to ground and at the collector to an energizing circuit which includes a battery 41 and a resistor 42. A condenser 43 is charged from the battery 41 by way of a load resistor 44. The base of the transistor 40 is connected by way of resistor 45 to ground. A control pulse source 46 is also connected to the base. The application of a control pulse 50, such as shown in FIGURE 5, will produce a voltage pulse 51 of the character indicated in FIGURE 6. The rise time of the pulse 51 is very short and the pulse is about one millimicrosecond wide at the base.

Prior art devices have been characterized by eratic performance leading to the production of output pulses which vary in their time occurrence with reference to the control pulse over intervals of several millimicroseconds, such as represented by pulses 52, 53 and 54. The present device eliminates the jitter which has been charactristic of operation of prior art devices. Thus, in accordance with one embodiment of the present invention, there is provided an epitaxial avalanche semiconductor device characterized by a low resistivity substrate with an epitaxial layer of resistivity of higher magnitude than that of the substrate and of the same conductivity type as the substrate with a graded junction therebetween. A base layer is diffused into the epitaxial layer and is of conductivity type opposite that of the epitaxial layer. An emitter layer is diffused into the base layer of the type the same as the epitaxial layer. In this embodiment, the surface concentrations of the base layer and the emitter layer are about $10^{19}$ and $10^{20}$ atoms/cm.$^3$, respectively. The substrate has a resistivity preferably less than 0.01 ohm-cm. with the epitaxial layer of resistivity approaching 1 ohm-cm. The base width in the region of the emitter preferably is of the order of 0.00004 inch with the total thickness of the epitaxial layer of about 0.0004 inch. Devices of this character wherein the ratios of dimensions, resistivities and surface concentrations are maintained have been found to provide a material improvement in the reliability of avalanche transistors.

It is to be understood that the foregoing is given by way of example and is not to be taken as limiting. Devices in which the ratios of dimensions are generally maintained fall within the scope of the present invention. This is in contrast with prior devices in which alloyed structures do not provide a wide collector layer with a low resistivity substrate. Further, the foregoing has been limited to use of epitaxial techniques. It will be understood that an N or P-type semi-conductor may be doubly diffused to form a low resistivity layer corresponding wtih substrate 12 on one face, the collector being formed by the N or P-type body. To the other face, the same diffusion techniques as above described may be employed to form the base layer and the emitter. Other variations may suggest themselves, permitting production of semiconductor devices in which a layer of substantial thickness and high resistivity forms a collector layer which is underlaid by a low resistivity layer, the thickness of the collector layer and its resistivity being such as to permit control of the trigger delay.

Having described the invention in connection with certain specific embodiments thereof, it is to be understood that further modifications may now suggest themselves to those skilled in the art and it is intended to cover such modifications as fall within the scope of the appended claims.

What is claimed is:

1. An avalanche semiconductor device which comprises:
   (a) a first layer of one conductivity type forming a low resistivity solid substrate,
   (b) a second layer over said substrate said second layer being of same conductivity type as said substrate and having resistivity an order of magnitude higher than that of said substrate with a graded boundary therebetween,
   (c) a base layer in the surface of said second layer opposite said substrate and of conductivity type opposite the conductivity type of said second layer with a junction at the intersection of said base layer and said second layer, and
   (d) an emitter layer in said base layer of the same conductivity type as said second layer with a junction at the intersection of said emitter layer and said base layer,
   (e) the said junction between the base layer and the second layer and the said junction between the emitter layer and the base layer being graded with the base layer of width about one-tenth the width of the second layer, the surface concentration of the dopant for the base layer being an order of magnitude less than the surface concentration of dopant for said emitter layer.

2. An article of manufacture which comprises:
(a) a low resistivity substrate of one conductivity type,
(b) an epitaxial layer of said one conductivity type formed on said substrate having a resistivity an order of magnitude greater than that of said substrate with a graded boundary at the intersection of said layer and said substrate,
(c) a diffused base layer having a depth about one-fourth the depth of said epitaxial layer and a surface concentration of a dopant of conductivity type opposite that of said epitaxial layer of about $10^{19}$ atoms/cm.$^3$ with a graded junction at the intersection of said base layer and said epitaxial layer, and
(d) a diffused emitter having a depth of about six-tenths the depth of said base layer and a surface concentration of conductivity determining dopant of said one conductivity type and having a surface concentration of the order of $10^{20}$ atoms/cm.$^3$ with a graded junction at the intersection of said diffused emitter and said diffused base layer.

3. An article of manufacture which comprises:
(a) a substrate of one conductivity type; of resistivity of the order of 0.01 ohm-cm.,
(b) an epitaxial layer of said one conductivity type on said substrate having a thickness of about 0.0004 inch with a graded boundary at the intersection of said epitaxial layer and said substrate,
(c) a diffused base layer having a depth of about 0.0001 inch and a surface concentration of a dopant of conductivity type opposite that of said epitaxial layer of about $10^{19}$ atoms/cm.$^3$ with a graded junction at the intersection of said diffused base layer and said epitaxial layer, and
(d) a diffused emitter having a depth of about 0.00006 inch and a surface concentration of conductivity determining dopant of said one conductivity type and having a surface concentration of the order of $10^{20}$ atoms/cm.$^3$ with a graded junction at the intersection of said diffused emitter and said diffused base layer.

4. An epitaxial avalanche semiconductor device which comprises:
(a) a substrate of one conductivity type of resistivity of about 0.01 ohm-cm.,
(b) an epitaxial layer of said one conductivity type formed on said substrate having a thickness of about 0.0004 inch with a graded boundary at the intersection of said substrate and said epitaxial layer,
(c) a diffused base layer having a depth of about 0.0001 inch and a surface concentration of a dopant of conductivity type opposite that of said epitaxial layer of about $10^{19}$ atoms/cm.$^3$ with a graded junction at the intersection of said layer and said epitaxial layer, and
(d) a diffused emitter having a depth of about 0.00006 inch and a surface concentration of conductivity determining dopant of said one conductivity type and having a surface concentration of the order of $10^{20}$ atoms/cm.$^3$ with a graded junction at the intersection of said diffused emitter and said diffused base layer.

5. An article of manufacture which comprises:
(a) a first layer of one conductivity type forming a low resistivity solid substrate,
(b) a second layer of said one conductivity type over said substrate having resistivity an order of magnitude higher than that of said substrate with a graded boundary therebetween,
(c) a base layer in the surface of said second layer opposite said substrate and of conductivity type opposite the conductivity type of said second layer with a junction at the intersection of said base layer and said second layer, and
(d) an emitter layer in said base layer of conductivity type the same as said second layer with a junction at the intersection of said emitter layer and said base layer,
(e) the said junction between the base layer and the second layer and the said junction between the emitter layer and the base layer being graded with the base layer of width about one-tenth the width of the second layer, the surface concentration of the dopant for the base layer being an order of magnitude less than the surface concentration of dopant for said emitter layer.

6. A semiconductor device, comprising:
(a) a body of semiconductor material of one conductivity type forming a low resistivity substrate,
(b) a collector layer of semiconductor material adjacent said body, said collector layer being of said one conductivity type and having a resistivity at least an order of magnitude higher than that of said body, with a graded boundary at the intersection of said body and said collector layer,
(c) a base layer of opposite conductivity type and said collector layer adjacent said collector layer with a graded junction at the intersection of said base layer and said collector layer, and
(d) an emitter layer of said one conductivity type adjacent said base layer with a graded junction at the intersection of said base layer and said emitter layer,
(e) the width of the portion of the said base layer beneath the said emitter layer being at least an order of magnitude smaller than the width of the said collector layer, the surface concentration of the dopant for the base layer being an order of magnitude less than the surface concentration of the dopant for said emitter layer.

References Cited by the Examiner

UNITED STATES PATENTS

| | | | |
|---|---|---|---|
| 2,878,152 | 3/1959 | Runyan et al. | 317—235 |
| 2,981,874 | 4/1961 | Rutz | 317—235 |
| 3,001,895 | 9/1961 | Schwartz et al. | 317—235 |
| 3,006,791 | 10/1961 | Webster | 317—235 |
| 3,131,098 | 4/1964 | Krsek et al. | 317—235 |
| 3,164,498 | 1/1965 | Loeb et al. | 418—177 |
| 3,165,811 | 1/1965 | Kleimack et al. | 317—235 |
| 3,220,894 | 11/1965 | Ruchardt et al. | 148—33 |
| 3,233,305 | 2/1966 | Dill | 29—25.3 |

JOHN W. HUCKERT, *Primary Examiner.*

R. SANDLER, *Assistant Examiner.*